Figures 1, 2:
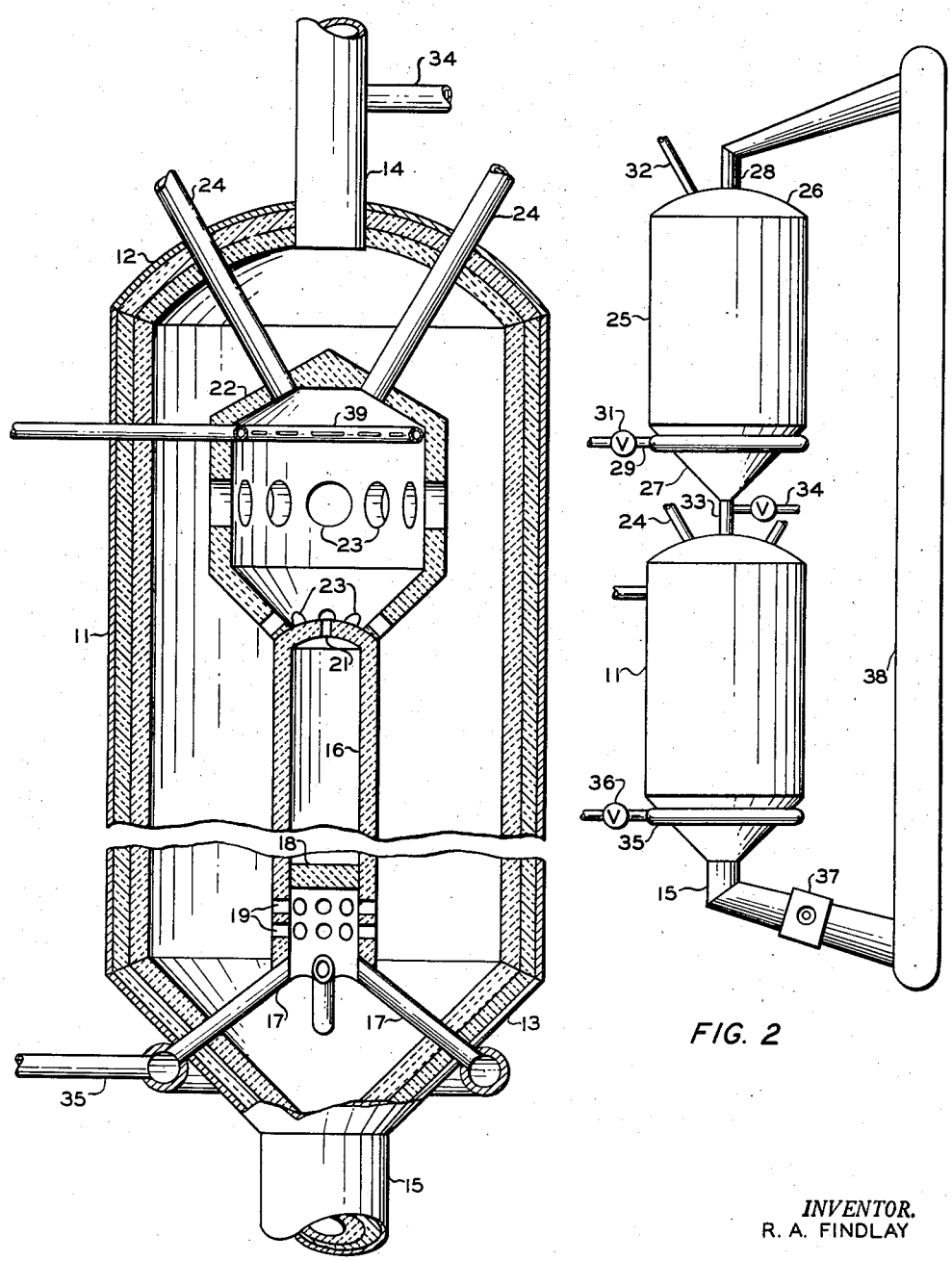

April 7, 1959

R. A. FINDLAY 2,881,134

PEBBLE HEATER APPARATUS AND PROCESS

Original Filed Sept. 18, 1950

INVENTOR.
R. A. FINDLAY

BY Hudson and Young

ATTORNEYS

United States Patent Office 2,881,134
Patented Apr. 7, 1959

2,881,134

PEBBLE HEATER APPARATUS AND PROCESS

Robert A. Findlay, Bartlesville, Okla., assignor to Phillips Petroleum Company, a corporation of Delaware Continuation of application Serial No. 185,371, September 18, 1950. This application September 18, 1953, Serial No. 381,019

8 Claims. (Cl. 208—165)

This invention relates to the conversion of hydrocarbons. In one of its more specific aspects it relates to the conversion of hydrocarbons in pebble heater apparatus. In another of its more specific aspects it relates to improved pebble heater apparatus for the conversion of hydrocarbons. In another of its more specific aspects it relates to an improved reaction chamber for pebble heater apparatus. In another of its more specific aspects it relates to an improved method for converting hydrocarbons.

This is a continuation of my U.S. Patent application, Serial No. 185,371, filed September 18, 1950, now abandoned.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heaters apparatus are generally formed as cylinders in which a solid heat exchange material is collected in the form of a gravitating bed. Hot heat exchange gases are sometimes introduced into the cylindrical bed at the periphery of its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated solid heat exchange material from the pebble heat chamber. In the withdrawal of solid heat exchange material from a substantially central point in the bottom of a pebble reaction chamber, the gravitating solid heat exchange material tends to form a cone. That material which is below and outside of the cone remains in what is substantially a stagnant area. At the same time, when solid heat exchange material is introduced centrally into the upper portion of the pebble reaction chamber, the top of the solid heat exchange material forms a cone extending downwardly and outwardly from the material inlet in the top of the chamber. It will thus be seen that the gravitating solid material bed is of lesser thickness at its periphery than at its axis because of the fact that the top of the bed is in the shape of a cone.

Reactant materials which are introduced into the reaction chamber are raised to conversion temperature by direct heat exchange with the hot solid heat exchange material in the reactiton chamber and resulting reaction products are removed from the upper portion of the reaction chamber. It has heretofore been thought that the gaseous material which flows upwardly through the fluent bed of solid heat exchange material within the reaction chamber tends to follow the path of least resistance. That path of least resistance is normally along the periphery of the fluent solid material bed inasmuch as the bed is thinner at the periphery than at its axis. I have discovered that a large portion of the non-uniform gas flow through a reaction chamber is due to the fact that gases tend to flow toward cool areas and the peripheral portions of the reaction chamber are the coolest areas of the fluent solid material bed within the reaction chamber. The gases are caused to expand in the hot areas of the reaction chamber and contract in the cooler areas of that chamber. Thus flow of gaseous material to the cooler areas results.

There are several reasons why the peripheral portion of the solid material bed is cooler than the axial portion thereof. It has been known for sometime that solid material flowing through the central portion of the reaction chamber gravitates more rapidly than do the solid materials in the peripheral portion of the bed unless gravitation in that axial portion is retarded by some flow control means such as baffles or the like. Thus the solid materials flowing through the central portion of the bed normally have less contact time with the gaseous materials in the reaction chamber and give up less of their heat to those materials than do solid materials flowing at a lower flow rate. On the other hand, the solid heat exchange material flowing through the peripheral portion of the solid heat exchange material bed is caused to contact gaseous material for a longer period of time by reason of its lower flow rate, thus giving up greater amounts of heat to the reactant and product materials. As the peripheral portion of the solid material contact bed gives up greater amounts of heat, that portion of the bed is cooled, thus attracting greater amounts of gaseous materials by reason of contraction of those gases which in turn gain additional heat from the solid heat exchange material, lowering the temperature of that solid material still further. Still another reason for non-uniform solid material temperature is found in the fact that as solid materials are introduced into the top of the reaction chamber they are caused to contact some gaseous materials while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the periphery of the solid material bed it has given up much more heat to gaseous material than has solid material which remains as an axial portion of the solid material bed.

Solid heat exchange material which is conventionally used in pebble heater apparatus is generally called "pebbles." The pebbles as used herein are similar to those described in U.S. Patent 2,536,436, issued to Robert R. Goins.

An object of this invention is to provide improved pebble heater apparatus for converting hydrocarbons. Another object of the invention is to provide improved means for controlling contact between gaseous materials and hot pebbles in a reaction chamber of pebble heater apparatus. Another object of the invention is to provide an improved method for controlling the flow of gaseous materials through pebble beds in reaction chambers of pebble heater apparatus. Another object of the invention is to provide a substantially annular bed of pebbles for contacting reactant materials in pebble heater apparatus. Another object of the invention is to prevent overcracking and undercracking of hydrocarbon materials in pebble heater reaction chambers. Other and further objects and advantages will be apparent to those skilled in the art upon study of the accompanying discussion and the drawings.

Broadly speaking, this invention comprises preventing the drop out of a central portion of a pebble bed in the reaction chamber of pebble heater apparatus. This invention comprises providing a central core in the reaction chamber which central core causes the formation of an annular pebble bed within the chamber. A gaseous material collection chamber is provided at the upper end of the central core and effluent outlet conduits are provided for removal of gaseous materials from the gaseous material collection chamber to a point exterior of the reaction chamber.

Better understanding of the invention will be obtained upon reference to the diagrammatic drawings in which Figure 1 is a schematic sectional elevation of a reaction chamber of this invention. Figure 2 is a schematic elevation of the pebble heater apparatus of this invention.

Referring particularly to Figure 1 of the drawings, pebble heater chamber 11 is an upright elongated chamber closed at its upper and lower ends by closure members 12 and 13, respectively. Pebble inlet conduit 14 is centrally positioned in closure member 12 and pebble outlet conduit 15 is centrally positioned in closure member 13. Core 16 is centrally positioned within chamber 11 and extends upwardly into the upper portion of chamber 11. Core 16 is supported at its lower end by reactant material inlet conduits 17 which extend upwardly from the closure member 13 in the bottom of reaction chamber 11. Reactant material inlet conduits 17 preferably open into a hollow portion in the bottom of core member 16 and a baffle 18 in the bottom portion of core member 16 prevent gaseous material from reactant material inlet conduit 17 from rising through the length of core member 16. Perforations 19 are preferably provided in the wall of core member 16 below baffle member 18 and form outlet ports for the introduction of reactant materials into the pebble bed from the bottom portion of core member 16. Core member 16 is preferably hollow in design as shown in the drawings so as to facilitate the removal of heat therefrom. That core may, however, be solid if desired. When the core is hollow it is desirable to provide an outlet port 21 in the upper end portion thereof. Outlet port 21 is not a required feature, however.

The structure disclosed above is in some instances modified by moving closure member 18 to the lower end of core 16 and by perforating conduits 17, preferably in their lower sides, intermediate closure member 13 and core 16. In such a modification, perforations 19 are not provided in core 16.

Gaseous material collection chamber 22 is also centrally provided within chamber 11 and is so adapted as to be supported on the upper end portion of core member 16. As shown in Figure 1, it is preferred that collection chamber 22 have a top portion which slopes downwardly and outwardly from an apex to its periphery. The bottom portion extends downwardly and inwardly from its periphery to the wall of core member 16. Collection chamber 22 is provided with openings 23 in its lower end and side walls so as to allow gaseous materials to pass therethrough. Gaseous effluent conduits 24 are provided in the upper end portion of gaseous material collection chamber 22 and extend upwardly through the upper end portion of chamber 11.

In the operation of the device shown in Figure 2 of the drawings, pebbles are introduced into the upper portion of a pebble heating chamber 25 which is an upright elongated chamber closed at its upper and lower ends by closure members 26 and 27 through pebble inlet conduit 28. The pebbles are gravitated downwardly through chamber 25 as a fluent contiguous mass therein. Heating material is introduced into the lower portion of chamber 25 through inlet conduit 29 and flow control valve 31. The heating material may be a fuel and air, the fuel being burned on the surface of pebbles within the lower portion of chamber 25. The heating material may also be a hot combustion gas obtained by burning fuel outside of chamber 25, or may be a hot combustion gas obtained by burning a fuel within chamber 25 but below or outside of the pebble bed within that chamber. The hot combustion gases are caused to pass upwardly countercurrent to the gravitating flow of pebbles within that chamber and the pebbles are raised to a high temperature by direct heat exchange with the hot combustion gases. The pebbles are ordinarily heated to a temperature within the range of between 1200° F. and 2800° F. depending upon the reaction products desired from the conversion within the reaction chamber. Temperatures within the range of between 1000° F. and 1600° F. are normally used for the conversion of hydrocarbon oils to form normally liquid olefins and aromatic hydrocarbon fractions such as gasoline and the like. Temperatures within the range of between 1800° F. and 2600° F. are utilized for converting normally gaseous materials, such as ethane to ethylene, acetylene, or the like. The temperature to which pebbles are heated within pebble heating chamber 25 are normally about 200° F. above the reaction temperature desired in reaction chamber 11. Gaseous materials are removed from the upper portion of chamber 25 through gaseous effluent conduit 32.

Pebbles which have been heated by the direct heat exchange with gaseous heating material in chamber 25 are gravitated from that chamber through pebble conduit 33 into the upper portion of reaction chamber 11 and are gravitated downwardly through that chamber as a fluent contiguous pebble mass. A hot inert gas, such as steam, is introduced into pebble conduit 33 through inlet conduit 34. Other inert gases which are non-deleterious to the reaction products within chamber 11 may be used for introduction into pebble conduit 33. This inert gas prevents the passage of combustion gases containing an excess of oxygen from the lower portion of chamber 25 into the upper portion of chamber 11, and prevents the passage of reaction products from the upper portion of chamber 11 into the lower portion of chamber 25. The steam or other inert gas introduced into conduit 33 through conduit 34 is preferably introduced into conduit 33 at sufficient pressure to cause the steam to flow downwardly through that conduit concurrent with the flow of pebbles therethrough. The steam forms a quiescent blanket over the inner surface of closure member 12 in the top of reaction chamber 11 and throughout the upper portion of the pebble bed. The pressure and volume of the steam is also preferably sufficient to substantially prevent escape of any reaction products upwardly into the reaction chamber above gaseous collector chamber 22.

The stream of hot pebbles which is introduced into chamber 11 is split by the apex of gaseous material collector chamber 22 and the stream is formed into an annular pebble bed within reaction chamber 11. The pebbles flow downwardly over and around gaseous material collector chamber 22 and downwardly around core member 16 as a contiguous gravitating mass and are finally removed from chamber 11 by flow between reactant material inlet conduits 17 and through pebble outlet conduit 15. Reactant materials in a gaseous form are introduced into the lower portion of chamber 11 through inlet conduit 35 having flow control valve 36 therein. The gaseous reactant materials from inlet conduit 35 flow upwardly through inlet conduits 17 and in one modification are collected within core member 16 below baffle member 18. The reactant materials are distributed from core member 16 through outlet ports 19 and flow upwardly through the gravitating mass of hot pebbles within chamber 11 in direct heat exchange therewith. The gaseous reactant materials are raised to conversion temperature within a very short space in the lower portion of reaction chamber 11 and are converted in a central portion of the length of that chamber.

As pointed out above, the inherent tendency for gaseous material flow is for such material to seek a path of least resistance through the pebble mass. Inasmuch as the bed is ordinarily thicker at its axial portion than at its peripheral portion, the normal flow of gaseous materials through the pebble bed is through the peripheral portion thereof. In the apparatus of this invention, the gaseous material collector chamber 22 extends downwardly into the pebble mass and ordinarily the upper portion of that collector chamber is covered by down-flowing hot pebbles. The pebbles at the top surface of the pebble bed are not subjected to the flow of gaseous materials therethrough as they gravitate downwardly and outwardly over the top of the pebble bed until they find a position of repose. Instead, the gaseous materials are removed through the central portion of the bed and the mass of pebbles which passes downwardly through the annular space between the outer wall of reaction chamber 11 and gaseous material collector chamber 22 is at substantially a uniform temperature for a given horizontal cross-section thereof.

Despite the fact that the central portion of the pebble bed is replaced by core 16 and gaseous material collector chamber 22, the portion of the pebble bed closest to those members tends to flow from reaction chamber 11 more rapidly than does the mass of pebbles in the peripheral portion of the pebble bed. The process of this invention has the advantage of causing the gaseous material to contact that portion of the pebble bed which is moving through the reaction chamber at the greatest rate of flow. The gaseous materials are thus caused to contact the pebbles which are at the highest temperature within the chamber.

One problem which has been encountered in the operation of reaction chambers of pebble heater apparatus during the conversion of hydrocarbons is the deposit of carbon layers on the inner surface of the top portion of the reaction chamber. This deposit of carbon on the inner surface of the reaction chamber is believed to be due to the fact that withdrawal of the gaseous materials from the upper portion of the reaction chamber has been so slow as to allow much of the gaseous material to contact the hot inner surface of the reaction chamber. That contact between the hot inner surface of the reaction chamber and the gaseous materials has caused the gaseous materials to be at least partially converted to coke on the surface of the chamber, thereby causing the formation of carbon deposits thereon. The instant invention has the advantage of providing a small chamber into which the gaseous materials are caused to flow directly from the pebble bed. The smaller chamber will cause an increase in the velocity of gaseous material flow by reason of the smaller volume of space for a given volume of gaseous material. The gaseous materials are removed from the upper portion of gaseous material collector chamber 22 through gaseous effluent conduits 24 at such a velocity that very little contact time between the inner surface of gaseous material collector chamber 22 and the gaseous material is possible. The inner surface of collector chamber 22 is in one modification blanketed by providing header members 39 within chamber 22 so as to cover the inner surface of that chamber with an insulating gas such as steam. The blanket of steam over the inner surface of collector chamber 22 is in some instances provided by increasing the volume of steam introduced into the apparatus through inlet conduit 34. The pressure at which the steam or other inert gas is introduced into conduit 33 is greater than that maintained in the reaction chamber. In this method of operation the row of inlets 23 in the side wall of collector chamber 22 are utilized for the removal of the inert gas and the inlets in the sloping bottom portion of collector chamber 22 are utilized for the removal of reaction products. Thus the entire upper end portion of the pebble stream is maintained in a dense blanket of inert gas which prevents the flow of reaction products into that portion of the chamber.

Pebbles which are cooled during the reaction within reaction chamber 11 are gravitated from that chamber through pebble outlet 15 and in response to pebble flow controller 37 are gravitated to the lower end portion of elevator 38 by which they are elevated to the upper end portion of pebble inlet conduit 28 and therethrough into the upper portion of pebble heater chamber 25.

Many modifications of this invention will be apparent to those skilled in the art upon study of the accompanying disclosure and the drawings. It is believed that these modifications are within the spirit and the scope of this disclosure.

I claim:

1. A improved pebble heater reaction chamber comprising in combination an upright elongated closed shell having imperforate side walls; a pebble inlet conduit centrally positioned in the top of said shell; conduit means connected to said pebble inlet conduit for introducing a gas thereto; a pebble outlet conduit centrally positioned in the bottom of said shell; a core member of uniform cross section and having a hollow bottom axially positioned within said shell and extending from the lower portion of the chamber formed within said shell upwardly into the upper portion of that chamber; conduit members extending between the bottom of said shell and the bottom portion of said core member, said conduit members being adapted to support said core member; a closure in the lower portion of said core member above said conduit members; a gas collector chamber axially positioned in said shell and supported on the upper end of said core member, said gas collector chamber having a cross sectional area substantially larger than said core member; gaseous material inlets in the wall of said gaseous material collector chamber; and gaseous effluent conduits extending from the upper end portion of said gaseous material collector chamber to the exterior of said shell; said shell, core member and gas collector chamber together defining a generally annular closed space and confining the countercurrent flow of said pebbles and said gaseous material therein.

2. An improved pebble heater reaction chamber comprising in combination an upright elongated closed shell having imperforate side walls; a pebble inlet conduit centrally positioned in the top of said shell; conduit means connected to said pebble inlet conduit for introducing a gas thereto; a pebble outlet conduit centrally positioned in the bottom of said shell; a core member of uniform cross section axially positioned within said shell and extending from the lower portion of the chamber formed within said shell upwardly into the upper portion of that chamber; conduit members extending between the bottom of said shell and the bottom portion of said core member, said conduit members being adapted to support said core member; a closure in the lower portion of said core member above said conduit members; outlets in the wall of said core member below said closure; a gas collector chamber axially positioned in said shell and supported on the upper end of said core member, said gas collector chamber having a cross sectional area substantially larger than said core member; a first plurality of gaseous material inlets distributed in the upper side wall of said gaseous collector chamber; a second plurality of gaseous material inlets in the lower end wall of said gaseous collector chamber; and gaseous effluent conduits extending from the upper end portion of said gaseous material collector chamber to the exterior of said shell; said shell, core member and gas collector chamber together defining a generally annular closed space and confining the countercurrent flow of said pebbles and said gaseous material therein.

3. An improved pebble heater reaction chamber comprising in combination an upright elongated closed shell having imperforate side walls; a pebble inlet conduit centrally positioned in the top of said shell; conduit means connected to said pebble inlet conduit for introducing a gas thereto; a pebble outlet conduit centrally positioned in the bottom of said shell; a core member of uniform cross section axially positioned within said shell and extending from the lower portion of the chamber formed within said shell upwardly into the upper portion of that chamber; conduit members extending between the bottom of said shell and the bottom portion of said core member, said conduit members being adapted to support said core member and being provided with openings into the lower portion of said core member; a closure in the lower portion of said core member above said conduit members forming a hollow space therebelow in said core member; outlets in the wall of said core member below said closure; a gas collector chamber axially positioned in said shell and supported on the upper end of said core member, said gas collector chamber having a cross sectional area substantially larger than said core member; gaseous material inlets in the wall of said gaseous material collector chamber; and gaseous effluent conduits extending from the upper end portion of said gaseous material collector chamber to the exterior of said shell; said shell, core member and gas collector chamber together defining a generally annular closed space and confining the countercurrent flow of said pebbles and said gaseous material therein.

4. The apparatus of claim 3 which includes means for introducing a gas into said pebble inlet conduit and means for introducing a gas into said gas collector chamber.

5. An improved pebble heater reaction chamber comprising in combination an upright elongated closed shell having imperforate side walls; a pebble inlet conduit centrally positioned in the top of said shell; conduit means connected to said pebble inlet conduit for introducing a gas thereto; a pebble outlet conduit centrally positioned in the bottom of said shell; a core member of uniform cross section axially positioned within said shell and extending from the lower portion of the chamber formed within said shell upwardly into the upper portion of that chamber; perforated conduit members extending between the bottom of said shell and the botom portion of said core member, said conduit members being adapted to support said core member; a gas collector chamber axially positioned in said shell and supported on the upper end of said core member, said gas collector chamber having a cross sectional area substantially larger than said core member; gaseous material inlets in the wall of said gaseous material collector chamber; and gaseous effluent conduits extending from the upper end portion of said gaseous material collector to the exterior of said shell; said shell, core member and gas collector chamber together defining a generally annular closed space and confining the countercurrent flow of said pebbles and said gaseous material therein.

6. A method for reacting hydrocarbons in a pebble heater reactor having a gaseous material collector positioned within the upper portion of said reactor and below pebble inlet means therein, which comprises gravitating heated pebbles into the upper end of said reactor, over and around said gaseous material collector and through said reactor as a compact mass; passing hydrocarbon reactant material countercurrently through said gravitating mass of pebbles whereby said hydrocarbon material is heated so as to thermally react said hydrocarbon; removing said pebbles from the lower portion of said reactor; removing resulting reaction products from said reactor through said gaseous material collector; passing an inert gas into said gaseous material collector so as to form a blanket of gas over the inner surface of said collector; and removing said inert gas through said gaseous material collector together with said reaction products.

7. A method for reacting hydrocarbons in a pebble heater reactor having a gaseous material collector positioned within the upper portion of said reactor and below pebble inlet means therein, which comprises gravitating pebbles at a temperature of at least 1200° F. into the upper end of said reactor, over and around said gaseous material collector and through said reactor as a compact mass; passing hydrocarbon reactant material countercurrently through said gravitating mass of pebbles whereby said hydrocarbon material is heated so as to thermally react said hydrocarbon; removing said pebbles from the lower portion of said reactor; removing resulting reaction products from said reactor through said gaseous material collector; introducing steam into the upper portion of said reactor and passing said steam downwardly and laterally into said gaseous material collector and in sufficient volume to form a blanket of steam over the inner surface of said collector; and removing said steam from said reactor through said gaseous material collector together with said reaction products.

8. A method for reacting hydrocarbons in a pebble heater reactor having a gaseous material collector positioned within the upper portion of said reactor and below pebble inlet means therein, which comprises gravitating pebbles at a temperature of at least 1200° F. into the upper end of said reactor, over and around said gaseous material collector and through said reactor as a compact mass; passing hydrocarbon reactant material countercurrently through said gravitating mass of pebbles whereby said hydrocarbon material is heated so as to thermally react said hydrocarbon; removing said pebbles from the lower portion of said reactor; removing resulting reaction products from said reactor through said gaseous material collector; introducing steam into the upper portion of said reactor and passing said steam downwardly and laterally into said gaseous material collector and in sufficient volume to form a blanket of steam over the inner surface of said collector; and removing said steam from said reactor through said gaseous material collector together with said reaction products.

References Cited in the file of this patent

UNITED STATES PATENTS

| | | |
|---|---|---|
| 1,995,293 | Clark | Mar. 26, 1935 |
| 2,563,322 | Ebbets et al. | Aug. 7, 1951 |
| 2,645,606 | Hepp | July 14, 1953 |
| 2,653,903 | Kilpatrick | Sept. 29, 1953 |
| 2,673,786 | Alleman | Mar. 30, 1954 |
| 2,673,791 | McIntire | Mar. 30, 1954 |
| 2,729,548 | Forkel | Jan. 3, 1956 |